(12) United States Patent
Cranga

(10) Patent No.: US 8,820,674 B2
(45) Date of Patent: Sep. 2, 2014

(54) ROTOR CARRIER STRUCTURE WITH A DAMPER DEVICE FOR AVOIDING UNSTABLE COUPLING BETWEEN RESONANT VIBRATION MODES

(75) Inventor: Paul Cranga, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 189 days.

(21) Appl. No.: 12/969,691

(22) Filed: Dec. 16, 2010

(65) Prior Publication Data

US 2011/0147512 A1 Jun. 23, 2011

(30) Foreign Application Priority Data

Dec. 17, 2009 (FR) ...................................... 09 06120

(51) Int. Cl.
*B64C 27/00* (2006.01)
(52) U.S. Cl.
CPC ......... *B64C 27/001* (2013.01); *B64C 2027/005* (2013.01); *B64C 2027/002* (2013.01)
USPC ..... 244/17.27; 74/572.4; 74/574.2; 74/574.3; 74/574.21; 74/573.12; 74/572.2
(58) Field of Classification Search
USPC .................. 244/17.11, 17.27, 60, 1 R, 173.2; 74/572.4, 574.2, 574.3, 574.21, 74/573.12, 572.2
See application file for complete search history.

(56) References Cited

U.S. PATENT DOCUMENTS

| | | | | |
|---|---|---|---|---|
| 1,361,222 A | * | 12/1920 | Berliner ..................... | 244/102 R |
| 4,431,148 A | * | 2/1984 | Mouille ..................... | 244/17.27 |
| 4,596,513 A | * | 6/1986 | Carlson et al. ............... | 416/145 |
| 5,316,240 A | * | 5/1994 | Girard et al. ............... | 244/17.27 |
| 5,390,543 A | * | 2/1995 | Staple et al. ............... | 244/17.11 |
| 5,558,191 A | * | 9/1996 | Lai ................................. | 188/379 |
| 5,788,182 A | * | 8/1998 | Guimbal .................... | 244/17.27 |
| 5,915,508 A | * | 6/1999 | Lai ................................ | 188/379 |
| 6,009,985 A | * | 1/2000 | Ivers .............................. | 244/54 |

(Continued)

FOREIGN PATENT DOCUMENTS

| | | |
|---|---|---|
| DE | 102007025934 A1 | 12/2008 |
| EP | 0250135 A2 | 12/1987 |

(Continued)

OTHER PUBLICATIONS

Search Report and Written Report, Application No. FR 2770825; dated Aug. 24, 2010.

*Primary Examiner* — Joseph W Sanderson
*Assistant Examiner* — Marc Burgess
(74) *Attorney, Agent, or Firm* — Brooks Kushman P.C.

(57) ABSTRACT

A carrier structure for a rotor and a method of preventing the coupling of the vibration modes of a carrier structure of a flying machine with the vibration modes of a rotor are provided. The carrier structure has an airframe and a mounting structure suitable for being engaged with the rotor. A vibration-damper mechanism is fitted to the mounting structure and has a resonator that includes a weight element, a damper, and a first deformable member. The weight element is a flapping weight element and is carried by the mounting structure via the first deformable member. The first deformable member allows the weight element to move with respect to the mounting structure and restrains the mobility of the weight element. The damper is interposed between the weight element and the mounting structure for damping the movement of the weight element.

12 Claims, 2 Drawing Sheets

(56) References Cited

U.S. PATENT DOCUMENTS

| | | | |
|---|---|---|---|
| 6,247,684 B1 * | 6/2001 | Manfredotti | 244/17.27 |
| 6,279,704 B1 | 8/2001 | Manfredotti | |
| 6,467,723 B1 * | 10/2002 | Rossetti et al. | 244/17.11 |
| 6,915,983 B2 * | 7/2005 | Thomassey et al. | 244/17.25 |
| 7,568,565 B2 * | 8/2009 | McFarland et al. | 188/380 |
| 2006/0241531 A1 * | 10/2006 | Gruber et al. | 601/2 |
| 2007/0034736 A1 * | 2/2007 | Ferrer | 244/17.27 |
| 2012/0025742 A1 * | 2/2012 | Masahiko | 318/114 |

FOREIGN PATENT DOCUMENTS

| | | |
|---|---|---|
| FR | 2769396 A1 | 4/1999 |
| FR | 2770825 A1 | 5/1999 |
| FR | 2784350 A1 | 4/2000 |
| FR | 2808256 A1 | 2/2001 |

* cited by examiner

ROTOR CARRIER STRUCTURE WITH A DAMPER DEVICE FOR AVOIDING UNSTABLE COUPLING BETWEEN RESONANT VIBRATION MODES

CROSS-REFERENCE TO RELATED APPLICATIONS

This application claims the benefit of FR 09 06120 filed on Dec. 17, 2009. That disclosure is incorporated in its entirety by reference herein.

FIELD OF THE INVENTION

The present invention relates to the field of equipment for a motorized flying machine comprising a carrier structure connected to a rotor head, as for a propeller airplane or a rotorcraft, for example. More particularly, the present invention relates to mechanisms for damping vibration induced by aeroelastic instabilities resulting from coupling between vibration modes of the carrier structure and vibration modes of the rotor. The invention thus provides a carrier structure having such a mechanism and a flying machine provided with such a carrier structure.

BACKGROUND OF THE INVENTION

Aircraft include flying machines fitted with a rotor connected to a carrier structure, e.g. an airplane fitted with a propeller or a rotorcraft fitted with a rotor for providing lift and possibly propulsion.

The rotor conventionally comprises a rotor mast secured to a hub, the hub carrying a plurality of radially-distributed blades.

Furthermore, the carrier structure possesses an airframe, sometimes referred to as a "fuselage", having engine means arranged therein suitable for driving the rotor in rotation. In addition, the carrier structure includes a rotor mounting structure enabling the rotor to be fastened to the airframe.

Such a mounting structure usually includes mechanical transmission means and fastener elements for fastening the transmission means to the airframe. For example, a mounting structure of a rotorcraft known as a "pylon" comprises a main gearbox for transmitting power and means for fastening said main gearbox to the airframe, such as suspension bars, for example.

The engine means of the carrier structure then drive the rotor via the gearbox means of the mounting structure.

The carrier structure and the rotor are each subjected to forced excitations inherent to the speed of advance of the aircraft.

The dynamic excitation of the rotor, e.g. the lift and propulsion rotor of a helicopter, results from aerodynamic loads to which the rotor is subjected, these aerodynamic loads being resolved along stationary axes as a coplanar force acting in the general plane of the rotor hub, which plane is perpendicular to the axis of rotation of the rotor, an axial force that acts along the axis of rotation of the rotor, and a coplanar moment acting in a plane perpendicular to the axis of rotation of the rotor tangentially to the rotary movement of the rotor hub. The frequencies of such vibrations along axes that are "fixed", i.e. tied to the airframe of the carrier structure, are equal to the product $kb\Omega$, where "$\Omega$" designates the speed of rotation of the rotor, "$b$" designates the number of blades, and "$k$" designates a positive integer. The fundamental frequencies correspond to the number "$k$" being equal to unity. These excitations are transmitted from the rotor to the structure via the pylon.

Similarly, the carrier structure is subjected to forced excitations. For example, the tail boom of a helicopter airframe is excited directly by a stream of turbulent air coming from the main lift and propulsion rotor.

Flying machines fitted with a rotor are generally structured to mitigate the consequences of such vibrations.

To this end, it is common practice to fit the rotor or the structure with anti-vibration systems, sometimes referred to as resonators, for filtering the dynamic forces at the frequencies that are the most troublesome, whether from the point of view of passenger comfort or from the need to avoid breaking an element that is subjected to such vibratory fatigue. These anti-vibration systems are then tuned to one of the harmonics of the speed of rotation of the rotor.

Under such conditions, proposals have been made, e.g. in document FR 2 808 256 (Eurocopter France), for pendular resonators in which the weight elements are mounted in pendular manner on the hub of the rotor head. Such pendular resonators serve to oppose the forced vibrations induced by the rotating rotor head by acting along the axis and in the plane of the rotor. The stiffness needed for such pendular resonators in order to filter the vibrations is provided by the centrifugal force field due to the rotation of the rotor. This rotation drives the pendular weight elements about hinges so that they perform harmonic motion at a frequency that is a multiple of the speed of rotation $\Omega$ of the rotor. The structure of such pendular resonators makes them easy to integrate in the rotor head.

Nevertheless, such pendular resonators are effective only at one given frequency. Such pendular resonators are arranged to be fitted to a rotor head located at the top of the carrier structure, the rotor providing lift and possibility also propulsion, and they do not take account of characteristics specific to the carrier structure, relating in particular to its mass and to its excitation frequency.

The effect of the resonators is to smooth vibration by creating anti-resonance at the given tuned frequency. Consequently, the resonator generates two new resonances (or vibration modes) at two respective frequencies that are situated on either side of the anti-resonance frequency. The frequency range defined by these two modes remains relatively narrow. Nevertheless, these two vibration modes created by the resonators are normally not troublesome insofar as both resonances differ from the given frequency that is to be filtered.

Vibration damper mechanisms are also known for damping the vibration that is the result of the forced excitation of the carrier structure. By way of example, reference may be made to document FR 2 784 350 (Eurocopter France) that describes a damped resonator arranged to be implanted in the tail of the carrier structure in order to filter given frequencies.

In addition to forced excitation, another vibratory phenomenon may give rise to major problems.

In the field of aviation in particular, a problem lies in attenuating vibratory phenomena induced by the aeroelastic instabilities to which a machine is subjected in flight. For example, such aeroelastic instabilities may result from coupling between the vibration modes of the carrier structure and the stream of air moving around it, i.e. in particular a fixed wing type structure (airplane wing) or a rotary wing type structure (rotor blades of a rotorcraft or airplane propeller). These instabilities are known to the person skilled in the art under the general term "flutter".

Other aeroelastic instabilities correspond for example to the instabilities known as "whirl flutter" designating coupling between vibration modes of a rotor fitted with blades and vibration modes of the carrier structure supporting the rotor.

These phenomena of "flutter" and of "whirl flutter" are characterized by limit cycle vibration or by diverging vibration that can lead to breaking mechanical parts or structural elements. It is therefore essential to take these phenomena into account in the design of an aircraft in order to ensure that the critical speeds (forward speed, speed of rotation of the rotor) lie outside the limits of the flight envelope.

In particular, with whirl flutter, manufacturers ensure that rotor vibration modes do not couple with carrier structure vibration modes, thereby ensuring that those two assemblies are mutually compatible. In general, this can be done by appropriately placing the resonance frequencies and the respective dampers of the vibration modes of the various assemblies.

Nevertheless, it is difficult a posteriori to modify the modal characteristics of the carrier structure or of the rotor, should such phenomena appear during the development of an aircraft. Furthermore, a manufacturer may need to modify an existing aircraft in order to satisfy specific requirements of a user, and that may have an impact on the behavior of the aircraft when faced with such instabilities.

To solve these phenomena that may arise in the manner explained above, the manufacturer cannot make use of the resonators as described above that serve to filter forced excitations but not to filter couplings. Under such circumstances, the manufacturer often decides to modify the carrier structure, e.g. by making it stiffer, where such a modification involves not only a financial cost, but also an impact in terms of weight, neither of which are negligible. Furthermore, it may be difficult to make the modifications in question to an existing machine.

The state of the art also includes the following documents: EP 0 250 135, DE 10 2007 025934, FR 2 769 396, and FR 2 770 825

Document EP 0 250 135 describes a rotor carrier structure.

Document DE 10 2007 025934 describes a machine tool provided with a device including springs and dampers for eliminating given vibration.

Document FR 2 769 396 relates to a device for reducing noise in a cabin and not for avoiding destructive coupling between the vibration modes of a carrier structure and the rotor of the aircraft, that device including at least one sensor for measuring the values of a vibratory and/or acoustic parameter representative of a vibratory and/or acoustic effect of at least one noise source, mechanical means that are controllable and suitable for creating a force capable of reducing said vibratory and/or acoustic effect, and a control unit for controlling the mechanical means as a function of the values measured by the censor.

Document FR 2 770 825 seeks to reduce the vibration present in the cabin of a rotary wing aircraft by using a resonator arranged in the cabin.

Those documents therefore do not relate to solving a problem of coupling between vibration modes of a carrier structure and vibration modes of a rotor.

SUMMARY OF THE INVENTION

An object of the present invention is thus to combat the phenomenon of unstable coupling between vibration modes of the carrier structure and vibration modes of the rotor of an aircraft, by means that are simple, inexpensive, and easily implemented on an existing aircraft. The principle is to provide damping of the vibration mode(s) of the carrier structure involved in the unstable coupling.

The object of the present invention is to provide a vibration damper mechanism for flying machines and having at least one rotor head, in particular a propeller airplane or a rotorcraft, making it possible to optimize attenuation of the vibration induced by the motion of the rotating rotor to which the airframe of the carrier structure of the flying machine is subjected. The present invention seeks more particularly to provide such a mechanism that satisfies the required conditions of efficiency, structural simplicity, and small weight and size that make it easy to install in a flying machine, possibly on an optional basis, and that provides a satisfactory compromise in terms of the constraints and difficulties mentioned above.

The present invention is based on providing the carrier structure of the flying machine with a vibration damper mechanism for absorbing vibration transmitted by the moving rotor head, which mechanism takes account of the rotor/structure coupling characteristics, i.e. not only the characteristics of the blades, but also the characteristics of the carrier structure, in particular characteristics relating to the frequencies and the masses of its own resonant modes. In order to provide this mechanism with good efficiency, while also satisfying the looked-for compromise criteria, the mechanism is installed in the path along which motion is transmitted from the rotor head to the structure, i.e. situated close to the center of the rotor head or on elements that are rigidly connected to the rotor head, but without occupying excessive space in the surroundings of said zone and/or without constituting an impediment, and also avoiding making the structure of the mechanism so complex as to harm its overall size and/or its light weight and/or the possibility of producing it at low cost. More particularly, the zone where the mechanism is located is selected to be a mounting structure that is commonly to be found in a flying machine, serving to assemble the airframe of the carrier structure with power transmission means that are interposed in the power transmission system that extends between the engine means and the rotor that is driven in rotation by the engine means. Such transmission means are subjected to vibration coming from the rotor, and they are organized for being assembled to the airframe. One such mounting structure comprises in particular a main gearbox for transmitting the power generated by the engine means in order to drive the rotor, thus presenting the advantage of being situated close to the rotor head and of being connected in practically rigid manner to the rotor mast. The vibration damper mechanism is advantageously grouped together as an independent member having its own fastener means for fastening to said mounting structure.

Under such circumstances, the invention relates to a carrier structure for a rotor of a flying machine, the carrier structure having an airframe and a mounting structure suitable for being engaged with the rotor, the mounting structure including transmission means driven by engine means of the carrier structure.

Such a carrier structure is mainly recognizable in that said mounting structure is fitted with a vibration-damper mechanism for preventing coupling between vibration modes of the carrier structure and vibration modes of a rotor fastened to said carrier structure, and said mechanism associates in particular a resonator having a weight element mounted to move on the mounting structure with damper means for damping the movement of the weight element being interposed between said weight element and said mounting structure, the weight element being a flapping weight element carried by the mounting structure via a first deformable member for restraining its mobility.

The resonator fitted with damper means is thus fastened as close as possible to the rotor in order to optimize its efficiency on the vibration induced by the rotor, and account is taken of the vibration modes of the carrier structure when subjected to instabilities in order to prevent coupling between the vibration modes of the carrier structure and the vibration modes of the rotor. The mechanism is easily mounted on the mounting structure and it may be mounted optionally, with the mechanism being adjusted and/or installed as a function of instability being observed on the aircraft in flight, and without major structural modification of said mounting structure.

The mechanism then has the effect of damping vibration over a broad frequency range, without creating anti-resonance, unlike a conventional resonator.

The damping provided serves to modify the vibration modes of the carrier structure fitted with the mechanism, and thus prevents destructive coupling being created between the vibration modes of the rotor and the vibration modes of the structure carrying the rotor.

Furthermore, in a variant, the mounting structure includes a main gearbox suitable for engaging with a rotor mast for a rotor, and the proposed mechanism is preferably mounted on such a main gearbox, commonly interposed between the engine means and the rotor. The main gearbox may also constitute a secondary gearbox for driving any rotor head in rotation, such as a tail rotor head.

The main gearbox has a casing bottom connected to the airframe of the carrier structure, and the mechanism may be arranged on the casing bottom, providing the elements between the casing bottom and the rotor head are sufficiently rigid and providing this location is sufficiently sensitive to the motion of the rotor head.

In another variant, the mounting structure includes a main gearbox suitable for engaging with a rotor mast for a rotor, the mounting structure has at least one suspension bar connecting a top portion of the main gearbox to the airframe, and the mechanism is mounted on the suspension bar.

In an embodiment of the resonator included in the mechanism, the mobility of the weight element is unidirectional in a plane that is orthogonal to and/or a plane that is parallel to the axis of rotation of the rotor. Taking the airframe as defining a three-dimensional frame of reference having a longitudinal axis, a transverse axis, and a vertical axis, the orthogonal plane is a plane parallel to the plane containing the longitudinal axis and the transverse axis of the airframe.

By way of example and in a simplified, but nevertheless satisfactory, embodiment, the mobility of the weight element takes place in at least one plane orthogonal to the axis of rotation of the rotor and/or in pitching about an axis of said plane.

In an embodiment, the first deformable member is constituted by any one of the members comprising at least one flexible blade, at least one torsion tube, and at least one coil spring, or any other analogous member providing the weight element with mobility.

The damper means may equally well be of the electromagnetic type, of the hydraulic type, or of any type presenting mechanical or elastic deformation such as, for example, being constituted by at least one second elastically deformable member made from an elastomer having a large loss angle. It would be possible to use any other types of means that are suitable for damping the movement of the weight element as induced by the vibration imparted to the mounting structure for the transmission means.

The first deformable member comprises means for opposing the vibration in a narrow, first frequency range as induced by forced excitation to which the rotor is subjected, with damper means that are means for opposing vibration giving rise to instability over a second frequency range that is broader than said first frequency range.

These functions performed by the first deformable member and by the damper means have the result of preventing destructive coupling appearing between the resonant frequency of a resonant vibration mode of a carrier structure and the resonant frequency of a resonant vibration mode of an aircraft rotor.

Under such circumstances, it is the critical speed for flutter that is increased, for example, so that the aircraft is not subjected to this phenomenon in any part of its flight envelope. Under such circumstances, the damping coefficients of the vibration modes need to be increased positively. Consequently, the increase in the value of the critical speed leads to an increase in the vibration frequency range, which justifies the need for a broader frequency band for the operation of the resonator with the damper means.

In non-exclusive manner, the invention also relates to an application for countering the phenomenon known as "whirl flutter".

In another aspect, said weight element has a given mass, said vibration mode of the carrier structure is associated with a given resonant frequency, and the stiffness of said mechanism is equal to:

$$K_r = \omega_s^2 * m_r$$

where $m_r$ represents the mass of the weight element, where $\omega_s$ represents the given resonant frequency of the vibration mode of the carrier structure to be processed, and where $K_r$ represents the stiffness of said mechanism.

It should be observed that, surprisingly, the stiffness of said mechanism is a function of the given resonant frequency of the vibration mode of the carrier structure for processing, and not a function of the resonant frequency of the mechanism.

Furthermore, the invention also provides a flying machine provided with a rotor and with a carrier structure including an airframe and a mounting structure for mounting the rotor to the airframe. In particular, the flying machine is remarkable in that the mounting structure is a carrier structure of the invention as described above for preventing coupling between the vibration modes of the carrier structure and the vibration modes of the rotor.

Finally, the invention provides a method of preventing the coupling of the vibration modes of a carrier structure of a flying machine with the vibration modes of a rotor, said carrier structure carrying said rotor of a flying machine having an airframe and a mounting structure suitable for engaging said rotor, said mounting structure including transmission means driven by engine means of the carrier structure.

In this method, said mounting structure is fitted with a vibration damper mechanism to prevent said coupling, said mechanism associating a resonator comprising a weight element movably mounted on the mounting structure, and damper means for damping the mobility of the weight element, which damper means are interposed between said weight element and said mounting structure, the weight element of the resonator being a flapping weight element carried by the mounting structure via a first deformable member for restraining its mobility.

Furthermore, it is possible to determine the final mass $m_r$ of the mechanism, the final damping coefficient $c_r$ of the mechanism, and the final stiffness $K_r$ of the mechanism with the help of the given mass $m_s$ of the carrier structure and the given resonant frequency $\omega_s$ of the vibration mode of the structure for processing by searching for the eigenvalues of the following system for a plurality of values for the damping coefficient $c_r$ of said mechanism and for the mass $m_r$ of the mechanism in order to obtain maximum damping of the vibration modes of the carrier structure coupled to the mechanism:

$$M\begin{pmatrix}\ddot{q}_i\\\ddot{x}\end{pmatrix}+C\begin{pmatrix}\dot{q}_i\\\dot{x}\end{pmatrix}+K\begin{pmatrix}q_i\\x\end{pmatrix}=0, \text{ where}$$

$$M=\begin{bmatrix}m_s&\\&m_r\end{bmatrix} C=\begin{bmatrix}c_r&-c_r\\-c_r&c_r\end{bmatrix} K=\begin{bmatrix}m_s\omega_s^2+k_r&-k_r\\-k_r&k_r\end{bmatrix}$$

in which $q_i$ represents the movement of the carrier structure determined by the usual methods, $\dot{q}_i$ represents the first time derivative of the movement of the carrier structure, $\ddot{q}_i$ represents the second time derivative of the movement of the carrier structure, x represents the movement of the weight element determined by the usual methods, $\dot{x}$ represents the first time derivative of the movement of the weight element, $\ddot{x}$ represents the second time derivative of the movement of the weight element, and $K_r$ is the stiffness of said mechanism being equal to the product of the mass $m_r$ of said mechanism multiplied by the square of the given resonant frequency $\omega_s$ of the vibration mode to be processed, and
by selecting the pair comprising the final weighting coefficient $c_r$ of said mechanism and the final mass $m_r$ of said mechanism that makes it possible to obtain maximum damping of the vibration modes of the carrier structure coupled to the mechanism. The final stiffness is deduced from the final mass by using the following equation:

$$K_r=\omega_s^2 * m_r.$$

It should be observed that the term "final" is used to designate the parameters that are applied for implementing said mechanism.

In one embodiment, a scan is made simultaneously through a plurality of values for the damping coefficient $c_r$ of said mechanism and for its mass $m_r$. A three-dimensional graph is then obtained presenting the damping coefficient $c_r$ of said mechanism and the mass $m_r$ of said mechanism, and also the damping coefficient of the vibration mode of the structure as determined using said system. The pair comprising the final damping coefficient $c_r$ and the final mass $m_r$ of said mechanism corresponds to the pair that generates a maximum damping coefficient for the vibration mode of the structure.

In a second embodiment, it is possible to set the damping coefficient $c_r$ to a given value, and then to look for the eigenvalues of the above system of equations for a plurality of values for the mass $m_r$ of the mechanism. Under such circumstances, a first graph is made having the quotient of said mass $m_r$ of said mechanism divided by the given mass $m_s$ of said carrier structure plotted along the abscissa and the damping coefficient of the vibration mode of the structure as obtained via said eigenvalues plotted up the ordinate.

The resulting curve presents a maximum representing an optimum in terms of damping contribution.

Thereafter, the final mass $m_r$ of said mechanism is determined for which the quotient of said mass $m_r$ of said mechanism divided by the given mass $m_s$ of said carrier structure gives rise to maximum damping of the carrier structure.

The final stiffness $K_r$ of said mechanism is then determined, said final stiffness $K_r$ being equal to the product of the final mass $m_r$ multiplied by the square of the given resonant frequency $\omega_s$ of the vibration mode to the processed.

Finally, a search is made for the eigenvalues of the preceding system for a plurality of values of the damping coefficient $c_r$ of said mechanism, while using the final mass $m_r$ and the final stiffness as previously determined. Under such circumstances, a second graph is made presenting the damping coefficient $c_r$ of said mechanism plotted along the abscissa and the damping coefficient of the vibration mode of the structure as obtained using said eigenvalues up the ordinate.

The resulting curve presents a maximum representing an optimum in terms of damping contribution.

The final damping coefficient is then equal to the damping coefficient of the mechanism that gives rise to said maximum.

In a third embodiment, it is possible to set of the mass $m_r$ and the stiffness $K_r$ of the mechanism to given values, and then to search for the eigenvalues of the above system of equations for a plurality of values of the damping coefficient $c_r$. Under such circumstances, a third graph is made presenting the damping coefficient $c_r$ of said mechanism plotted along the abscissa and the damping coefficient of the vibration mode of the structure as obtained via said eigenvalues plotted up the ordinate.

The resulting curve presents a maximum representing an optimum in terms of damping contribution.

The final damping coefficient is then equal to the damping coefficient of the mechanism that gives rise to said maximum.

Finally, a search is made for the eigenvalues of the preceding system, while using the value of the final damping coefficient $c_r$ of said mechanism and using a plurality of values for its mass $m_r$. Under such circumstances, a second graph is made having the quotient of said mass $m_r$ of said mechanism divided by the given mass $m_s$ of said carrier structure plotted along the abscissa and the damping coefficient of the vibration mode of the structure as obtained via said eigenvalues plotted up the ordinate.

The resulting curve presents a maximum representing an optimum in terms of damping contribution.

Thereafter, the final mass $m_r$ of said mechanism is determined for which the quotient of said mass $m_r$ of said mechanism divided by the given mass $m_s$ of said carrier structure gives rise to maximum damping of the carrier structure.

The final stiffness $K_r$ of said mechanism is then determined, said final stiffness being equal to the product of the final mass $m_r$ multiplied by the square of the given resonant frequency $\omega_s$ of the vibration mode to the processed.

BRIEF DESCRIPTION OF THE DRAWINGS

An embodiment of the present invention is described below with reference to FIGS. 1 and 2 of the accompanying drawings.

In FIG. 1, a flying machine 30 essentially comprises a carrier structure 40 and a rotor 20.

DETAILED DESCRIPTION OF THE PREFERRED EMBODIMENT

Figure 1:
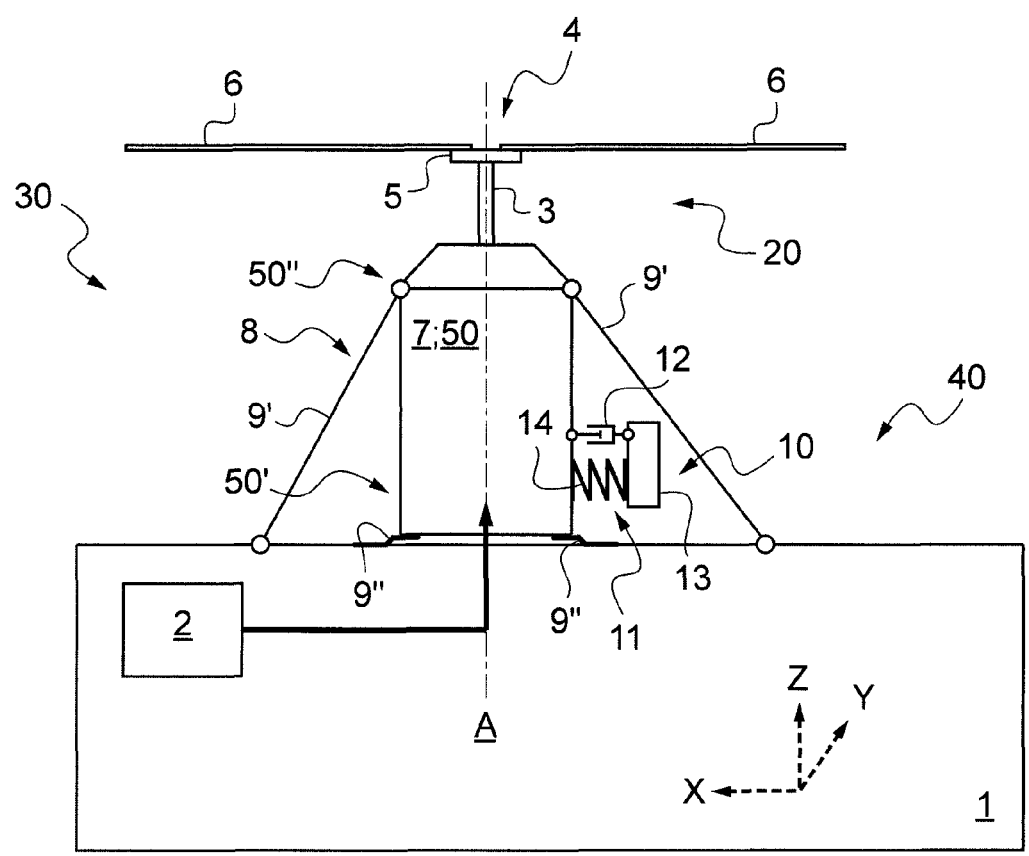
FIG. 1 constitutes a diagram showing a flying machine provided with a carrier structure incorporating a vibration absorber mechanism that damps in accordance with the present invention. The vibration absorber mechanism can be named "vibration damper mechanism", "damper mechanism" or simpler "mechanism" for example.

In the embodiment shown in FIG. 1, which constitutes a rotorcraft, the carrier structure 40 is constituted in particular by an airframe 1, referred to herein as the "fuselage", having the equipment of the flying machine mounted therein, together with the crew, and where appropriate, passengers. The airframe includes engine means 2 for driving the rotor 20 in rotation.

The rotor 20 comprises a rotor mast 3 engaged on a rotor head 4. The rotor head 4 comprises in particular a hub 5 that carries blades 6 and that is connected to the rotor mast 3 so as to be driven in rotation.

Furthermore, the carrier structure 40 includes a mounting structure 8 arranged at the top of the airframe 1 to carry the rotor 20. This mounting structure comprises power transmission means 7 interposed in the transmission system between the engine means 2 and the rotor head 4, and more particularly between the engine means 2 and the rotor mast 3.

Such transmission means 7 are constituted by a main gearbox 50 that is commonly fitted to rotorcraft and that is connected to the rotor mast 3 to drive a rotor head 4, the main gearbox 50 being located at the top of the airframe 1 of the flying machine when it is standing on the ground.

The main gearbox 50 is thus incorporated within the mounting structure 8, sometimes known as a pylon, that is located vertically above the airframe 1.

In conventional manner in this field, the mounting structure 8 is fitted with various fastener elements 9', 9" enhancing the stability thereof, in particular against the forces and vibration to which it is subjected and coming from the rotor 20.

For example, the mounting structure may comprise suspension bars 9' connecting a top portion 50" of the main gearbox to the airframe 1. Furthermore, the bottom 50' of the gearbox is fastened to the airframe 1 by a fastener element 9" of the type comprising an antivibration system with an integrated bar resonator.

The flying machine 30 incorporates a mechanism 10 for absorbing the vibration induced, in particular by the rotor head 4 in motion. This mechanism 10 is installed via the mounting structure 8 for mounting the transmission means 7 on the aircraft, and in particular via the main gearbox 50. More particularly, the mechanism 10 is arranged on the side wall of the bottom 50' of the casing of the main gearbox 50. The mechanism is thus not located between the bottom 50' of the gearbox and the airframe. Likewise, in this variant, the mechanism 10 is not connected to the suspension bars, but is fastened solely to the main gearbox.

This mechanism 10 associates a resonator 11 and damper means 12 allocated to the resonator 11 in order to take account of the characteristics of the carrier structure 40, and in particular its resonant excitation frequency, with reference to absorbing the vibrations induced by setting the rotor head 4 into motion while the aircraft is moving.

The resonator 11 comprises a movable weight element 13, such as a flapping weight element, that is fastened to the mounting structure 8 via a first deformable member 14. Mounting the weight element 13 in this way imparts mobility thereto suitable for opposing the vibration to which the transmission means 7 are subjected, and more particularly by said mounting structure 8, and induced in particular by setting the rotor head 4 into motion.

The first deformable member 14 is a member suitable for filtering the vibration induced by the moving rotor head 4 over a narrow, first range of frequencies. By way of example, the weight element 13 is mounted to move relative to the mounting structure 8 in bending, e.g. by means of a blade or an analogous flexible member constituting the first deformable member 14. The weight element 13 is allowed to move in an XY plane orthogonal to the axis of rotation A of the rotor 3, or in pitching about the axis Y in said plane that extends transversely relative to the general long orientation of the fuselage. The mass $m_r$ of the weight element may be determined as described above where the maximum damping coefficient provides for the deduction of the $m_r$ and $c_r$ pair for use with the mechanism, which in turn provides for the calculation of $K_r$.

The damper means 12 are interposed between the weight element 13 and the mounting structure 8, which they engage. In the embodiment shown, the damper means are deformable means of the hydraulic type. The damper means 12 are suitable for accompanying the movement of the weight element 13 as a function of the vibration transmitted to the mounting structure 8 by the rotor 20, in a second frequency range that is broader than the first frequency range and relating to the opposition to this vibration as procured by the first deformable member 14. Surprisingly, unstable coupling between the mounting structure 8 and the fuselage 1 is then avoided, because of the broadening of the frequency band on the basis of which the mechanism 10 is suitable for filtering vibration coming from the rotor head 4.

Naturally, the damper means may be of the electromagnetic type or indeed, and not exclusively, of the elastic type, using an elastomer having a large loss angle. In this way, the resonator is fastened as close as possible to the rotor, on one of the elements of the mounting structure so as to limit the contribution of the higher vibration modes of the carrier structure and so as to maximize efficiency on the modes that are responsible for unstable coupling. Limiting movement of the center of the rotor is a condition for avoiding coupling between the rotor and the structure.

Figure 2:
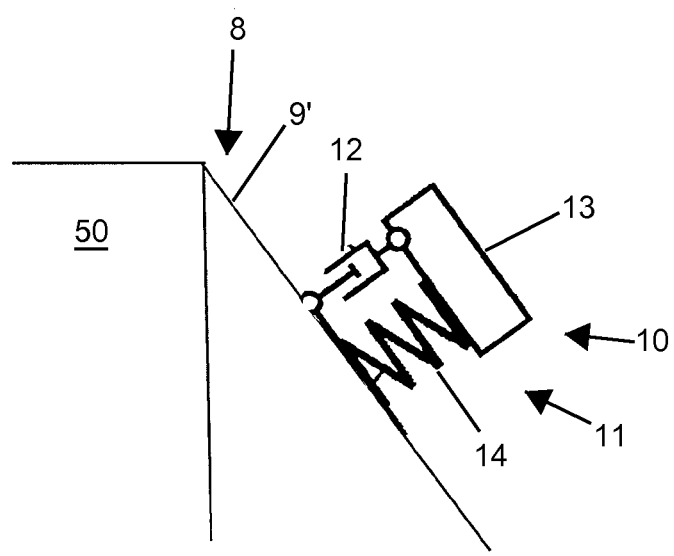
FIG. 2 illustrates an alternative embodiment of the carrier structure 40 and a rotor 20 with a vibration damper mounted to a suspension bar.

Finally, it should be observed that in an alternative to the variant shown diagrammatically in FIG. 1, the mechanism 10 may be arranged on a suspension bar 9', for example, as shown in FIG. 2.

What is claimed is:

1. A carrier structure for a rotor of a flying machine, the carrier structure comprising:
   a mounting structure supported by an airframe and suitable for being engaged with the rotor, the mounting structure including a gearbox having a top portion adjacent to the rotor and a bottom portion adjacent to the airframe and connected in a rigid manner to the rotor mast, the rotor having a rotor mast and a rotor head with elements between the bottom portion and the rotor head being rigid, the mounting structure having a plurality of suspension bars connecting the top portion of the gearbox to the airframe, and a plurality of fastener elements rigidly connecting the bottom portion of the gearbox to the airframe; and
   an anti-coupling vibration-damper mechanism connected to the gearbox and configured to act as a resonator to prevent aeroelastic instabilities due to vibrational coupling between vibration modes of the carrier structure and vibration modes of the rotor, the mechanism having a flapping weight element, a first deformable member connecting the weight element to the mounting structure and restraining the mobility of the weight element, and a damper interposed between the weight element and the mounting structure for damping the movement of the weight element.

2. The carrier structure of claim 1 wherein the first deformable member restrains the mobility of the weight element in a plane orthogonal to the axis of rotation of the rotor.

3. The carrier structure of claim 1 wherein the damping means is an elastomeric member.

4. The carrier structure of claim 1 wherein the first deformable member is configured to oppose vibration in a narrow, first frequency range as induced by instabilities to which the rotor is subjected by the carrier structure, and wherein the damper means is configured to oppose vibration causing instability over a second frequency range that is broader than the first frequency range to filter vibration coming from the rotor head to the carrier structure.

5. The carrier structure of claim 1 wherein the stiffness of the mechanism is a function of the given resonant frequency of the vibration mode of the carrier structure to be processed.

6. The carrier structure of claim 1 wherein the anti-coupling vibration-damper mechanism is connected to a side wall of the gearbox and positioned between the top portion and the bottom portion of the gearbox.

7. The carrier structure of claim 1 wherein each of the plurality of fastener elements is adapted to enhance the stability of the gearbox against forces and vibrations coming from the rotor.

8. The carrier structure of claim 1 wherein each of the plurality of suspension bars extends from the top portion of the gearbox to the airframe thereby connecting the top portion of the gearbox to the airframe; and
   wherein each of the plurality of fastener elements extends from the bottom portion of the gearbox to the airframe thereby connecting the bottom portion of the gearbox to the airframe.

9. The carrier structure of claim 1, wherein said weight element has a given mass, said vibration mode of the carrier structure is associated with a given resonant frequency, and the stiffness of the mechanism is equal to:

$$K_r = \omega_s^2 * m_r$$

where $m_r$ represents the mass of the weight element, where $\omega_s$ represents the given resonant frequency of the vibration mode of the carrier structure to be processed, and where $K_r$ represents the stiffness of the first deformable member of the mechanism.

10. The carrier structure of claim 1, wherein the final mass $m_r$ of said mechanism, the final damping coefficient $c_r$ of said mechanism, and the final stiffness of said mechanism are determined with the help of the given mass $m_s$ of said carrier structure and the given resonant frequency $\omega_s$ of the vibration mode of the structure for processing using the eigenvalues searched from the following system for a plurality of values for the damping coefficient $c_r$ of said mechanism and for the mass $m_r$ of the mechanism:

$$M\begin{pmatrix} \ddot{q}_i \\ \ddot{x} \end{pmatrix} + C\begin{pmatrix} \dot{q}_i \\ \dot{x} \end{pmatrix} + K\begin{pmatrix} q_i \\ x \end{pmatrix} = 0, \text{ where}$$

$$M = \begin{bmatrix} m_s & \\ & m_r \end{bmatrix} \quad C = \begin{bmatrix} c_r & -c_r \\ -c_r & c_r \end{bmatrix} \quad K = \begin{bmatrix} m_s\omega_s^2 + k_r & -k_r \\ -k_r & k_r \end{bmatrix}$$

in which $q_i$ represents the movement of the carrier structure, $\dot{q}_i$ represents the first time derivative of the movement of the carrier structure, $\ddot{q}_i$ represents the second time derivative of the movement of the carrier structure, x represents the movement of the weight element, $\dot{x}$ represents the first time derivative of the movement of the weight element, $\ddot{x}$ represents the second time derivative of the movement of the weight element, and $K_r$ r is the stiffness of said mechanism, equal to the product of the mass $m_r$ of said mechanism multiplied by the square of the given resonant frequency $\omega_s$ of the vibration mode to be processed, wherein the pair comprising the weighting coefficient $c_r$ of said mechanism and the mass $m_r$ of said mechanism is selected that provides maximum damping of the vibration modes of the carrier structure coupled to the mechanism.

11. The carrier structure of claim 10 wherein the eigenvalues are searched with the damping coefficient $c_r$ set to a given value with a plurality of values for the mass $m_r$ such that a graph is made with the quotient of said mass $m_r$ of said mechanism divided by the given mass $m_s$ of said carrier structure plotted along an abscissa and the damping coefficient of the vibration mode of the structure as obtained via said eigenvalues plotted on an ordinate to provide a resulting curve presenting a maximum representing an optimum in terms of damping contribution.

12. The carrier structure of claim 10 wherein the eigenvalues are searched with the mass $m_r$ and the stiffness $K_r$ set to given values with a plurality of values for the damping coefficient $c_r$ such that a graph is made with the damping coefficient $c_r$ of said mechanism plotted along an abscissa and a damping coefficient of the vibration mode of the structure as obtained via said eigenvalues plotted up an ordinate to provide a resulting curve presenting a maximum representing an optimum in terms of damping contribution.

\* \* \* \* \*